United States Patent
Kadioglu et al.

(10) Patent No.: US 10,007,538 B2
(45) Date of Patent: Jun. 26, 2018

(54) ASSIGNING APPLICATIONS TO VIRTUAL MACHINES USING CONSTRAINT PROGRAMMING

(71) Applicant: Oracle International Corporation, Redwood Shores, CA (US)

(72) Inventors: Serdar Kadioglu, Somerville, MA (US); Michael Colena, Hollis, NH (US); Samir Sebbah, Medford, MA (US); Mirza Mohsin Beg, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 15/211,458

(22) Filed: Jul. 15, 2016

(65) Prior Publication Data

US 2017/0220364 A1     Aug. 3, 2017

Related U.S. Application Data

(60) Provisional application No. 62/288,576, filed on Jan. 29, 2016.

(51) Int. Cl.
    *G06F 9/455*          (2018.01)

(52) U.S. Cl.
    CPC ...... *G06F 9/45508* (2013.01); *G06F 9/45558* (2013.01); *G06F 2009/4557* (2013.01)

(58) Field of Classification Search
    CPC .................................................. G06F 9/45558
    See application file for complete search history.

(56) References Cited

U.S. PATENT DOCUMENTS

| 7,313,532 B2 | 12/2007 | Mariamova et al. |
| 7,478,419 B2 | 1/2009 | Anderson et al. |
| 8,065,255 B2 | 11/2011 | Colena et al. |
| 8,126,834 B2 | 2/2012 | Chen et al. |

(Continued)

OTHER PUBLICATIONS

Zhu et al., "Meeting Scheduling System Based on Open Constraint Programming" Banks Pidduck et al. (Eds.): CAISE 2002, LNCS 2348, 5 pages, 2002.Springer-Verlag Berlin Heidelberg 2002.

(Continued)

*Primary Examiner* — Charlie Sun
(74) *Attorney, Agent, or Firm* — Invoke

(57) ABSTRACT

Techniques for assigning applications to virtual machines (VMs) using constraint programming are disclosed. The applications are associated with application groups. The assignment problem requires that each application of a particular application group be assigned to a VM hosted by a same machine. A data model, for application to a constraint programming solver, formulates the assignment problem as a set of constraints for a solution to be found. The data model includes a set of data model elements corresponding to the applications to be processed. The data model includes a set of data model elements corresponding to the VMs. The data model includes a set of constraints that limits assignment of any particular application to a VM corresponding to a tenant associated with the particular application. The set of constraints further limits assignment of applications corresponding to a same application group to VMs executing on a same machine.

20 Claims, 7 Drawing Sheets

(56) References Cited

U.S. PATENT DOCUMENTS

| | | | |
|---|---|---|---|
| 8,165,980 | B2 | 4/2012 | Chen et al. |
| 8,165,981 | B2 | 4/2012 | Colena et al. |
| 8,301,582 | B2 | 10/2012 | Huberman et al. |
| 8,447,716 | B2 | 5/2013 | Bagley et al. |
| 8,504,501 | B2 | 8/2013 | Colena et al. |
| 8,645,302 | B2 | 2/2014 | Chen et al. |
| 8,751,425 | B2 | 6/2014 | Bagley et al. |
| 9,588,819 | B2 | 3/2017 | Kadioglu et al. |
| 2002/0059427 | A1* | 5/2002 | Tamaki ............ G06F 9/5027 709/226 |
| 2012/0155264 | A1 | 6/2012 | Sharma |
| 2014/0089480 | A1* | 3/2014 | Zhu ............ G06F 9/50 709/223 |
| 2014/0196056 | A1* | 7/2014 | Kottomtharayil ....... G06F 9/505 718/105 |
| 2015/0118756 | A1 | 4/2015 | Pollack |
| 2015/0348065 | A1 | 12/2015 | Doganata et al. |
| 2016/0086081 | A1 | 3/2016 | Lee et al. |
| 2016/0306671 | A1 | 10/2016 | Kadioglu et al. |

OTHER PUBLICATIONS

Lecoutre et al., "Reasoning from Last Conict(s) in Constraint Programming", dated 2009, 39 pages.

Kovacs et al., "Constraint Programming Approach to a Bilevel Scheduling Problem", dated Mar. 4, 2010, 29 pages.

Hladik et al., "Solving Allocation Problems of Hard Real-Time Systems with Dynamic Constraint Programming", dated 2006, 10 pages.

Asaf et al., "Applying Constraint Programming to Identification and Assignment of Service Professionals", Springer-Verlag Berlin Heidelberg, 2010, pp. 24-37.

Frisch et al.. "The Rules of Constraint Modelling". Artificial Intelligence Group, Dept. of Computer Science, Univ. of York, UK, 2005, 8 pages.

IBM, "WebSpaere extreme Scale Overview", Available at : <http://www-01.ibm.com/support/knowledgecenter/SSTVLU_7.1.1/com.ibm.websphere.extremescale.doc/cxsoverview.html>, Retrieved on Aug. 27, 2015, 3 pages.

Kuhn, H. W., "The Hungarian Method for the Assignment Problem", Mar. 1955, pp. 83-97.

Milano et al., "Constraint Programming", Intelligenza Artificiale, vol. 3, No. 1-2, pp. 28-34, 2006.

Naveh et al., "Workforce Optimization: Identification and Assignment of Professional Workers Using Constraint Programming", Ibm J_ Res. & Dev., vol. 51, No. 3/4, May / Jul. 2007, pp. 263-279.

Richter et al., "Optimatch: Applying Constraint Programming to Workforce Management of Highly Skilled Employees", Int. J_ Services Operations and Informatics, vol. 3, N. 3/4, 2008, pp. 258-270.

Slaney, John, "Constraint Modelling: A Challenge for First Order Automated Reasoning", NICTA and the Australian National University, Jul. 2009, pp. 11-21.

Smith, Barbara M., "A Tutorial on Constraint Programming", School of Computer Studies Research Report Series, Apr. 1995, pp. 1-21.

Smith, Barbara M., "Modelling for Constraint Programming", Cork Constraint Computation Centre, University College Cork, Ireland, Sep. 2005, 18 pages.

Regin and Rezgui, "Discussion about Constraint Programming Bin Packing Models," AI for Data Center Management and Cloud Computing: Papers from the 2011 AAAI Workshop (WS-11-08) (2011).

* cited by examiner

US 10,007,538 B2

ASSIGNING APPLICATIONS TO VIRTUAL MACHINES USING CONSTRAINT PROGRAMMING

BENEFIT CLAIM, INCORPORATION BY REFERENCE

This application claims the benefit of U.S. Provisional Patent Application 62/288,576, filed Jan. 29, 2016, which is hereby incorporated by reference.

TECHNICAL FIELD

The present disclosure relates to the use of constraint programming. In particular, the present disclosure relates to assigning applications to virtual machines using constraint programming.

BACKGROUND

A computer network, such as a multi-tenant cloud computing network, provides a pool of resources that are shared amongst multiple client devices. Examples of resources include a processor, a server, a data storage device, a virtual machine (VM), a platform, and/or a software application. Client devices may independently request computing services, such as server time and network storage space, as needed. Each resource is associated with a maximum capacity, limiting a level of computing services that may be served by the resource. Available resources are dynamically assigned to the requests and/or client devices on an on-demand basis.

Additionally, the computer network is shared amongst multiple tenants. A tenant is an entity, such as an individual or a corporation, that is associated with one or more client devices for accessing the computer network. Each tenant may be independent from other tenants. Tenant isolation refers to processing and/or storing data in a multi-tenant cloud computing network such that each particular tenant may only access the data corresponding to the particular tenant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
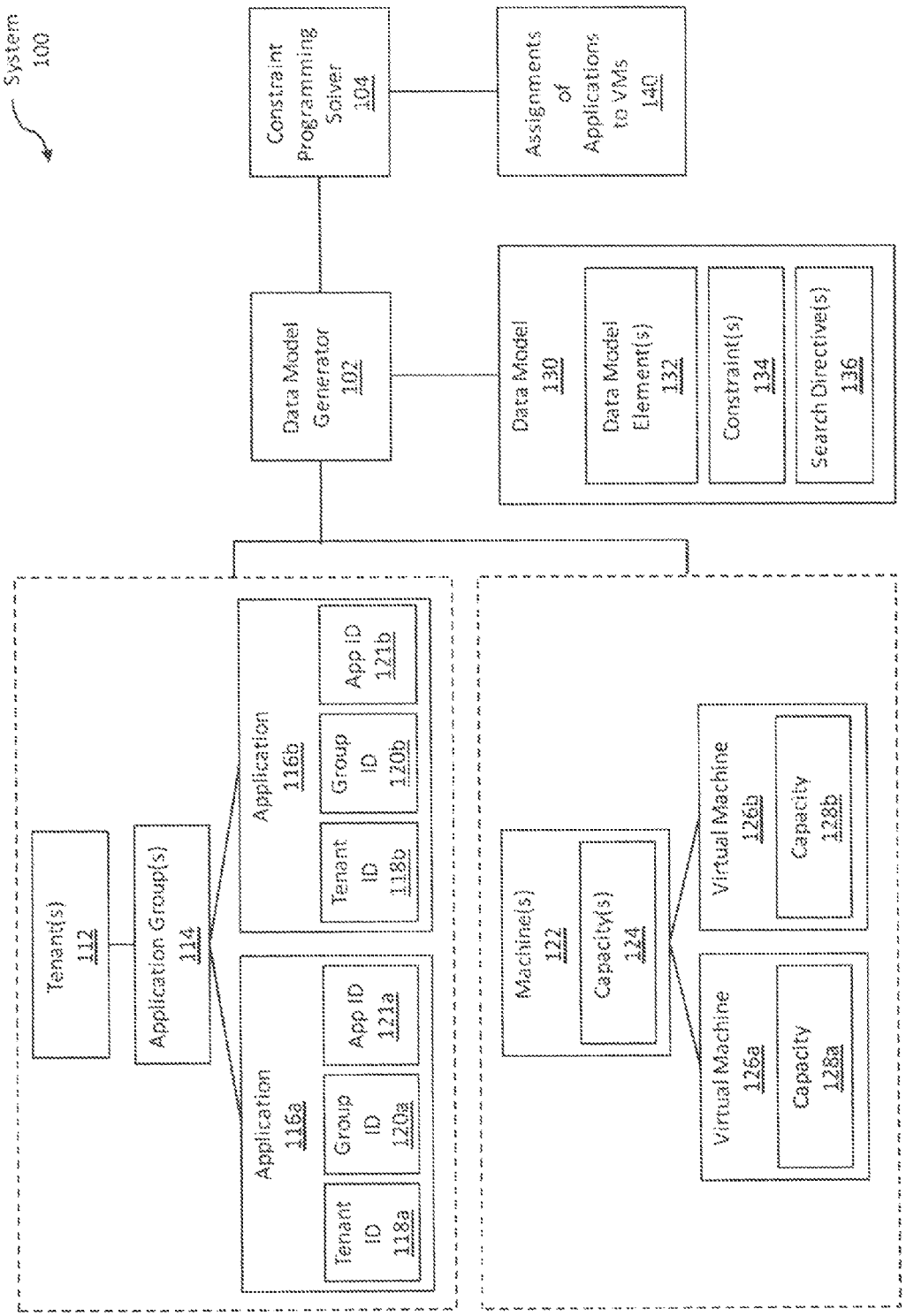
FIG. 1A illustrates a data model generation system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DATA MODEL GENERATION SYSTEM
3. GENERATING A DATA MODEL FOR APPLICATION TO A CONSTRAINT PROGRAMMING SOLVER FOR ASSIGNING APPLICATIONS TO VIRTUAL MACHINES
   A. SPECIFYING DATA MODEL ELEMENTS
   B. SPECIFYING CONSTRAINTS
   C. SPECIFYING SEARCH DIRECTIVES
   D. GENERATING AND UPDATING A DATA MODEL
4. EXAMPLE EMBODIMENT
5. ALLOCATION AND ASSIGNMENT OF VIRTUAL MACHINES
6. CLOUD COMPUTING NETWORKS
7. MISCELLANEOUS; EXTENSIONS
8. HARDWARE OVERVIEW

1. General Overview

One or more embodiments relate to a computer network that includes multiple machines. Each machine hosts one or more virtual machines (VMs). The computer network is shared amongst multiple tenants. Each tenant is associated with one or more application groups. Each application group includes one or more applications to be processed by the VMs of the computer network.

An application group is a logical grouping of applications. Applications of a same application group are related to a same set of data records. As an example, a computer network may implement a Sales Database corresponding to a particular tenant. The computer network may execute multiple applications for indexing records of the Sales Database. One application may index records corresponding to the United States. Another application may index records corresponding to Canada. Another application may index records associated a high security level. Another application may index records associated with a low security level. All four applications may be classified into a same application group because each of the four applications are related to the same Sales Database.

One or more embodiments include generating a data model for application to a constraint programming solver for assigning applications to VMs. Assignments of applications to VMs achieve one or more of the following objectives:

(a) Each application assigned to a particular VM corresponds to a same tenant;

(b) Each application of a particular application group is assigned to a VM hosted by a same machine;

(c) Each application of a particular application group is assigned to different VMs;

(d) The number of applications assigned to a particular VM (also referred to herein as a "load" of the particular VM) does not exceed the maximum capacity of the particular VM;

(e) The number of applications assigned to a particular machine (also referred to herein as a "load" of the particular machine) does not exceed the maximum capacity of the particular machine; and (f) The load is balanced across the VMs.

The problem of assigning applications to VMs while achieving the above objectives is referred to herein as the "assignment problem."

In an embodiment, a data model is generated for application to a constraint programming solver. The data model formulates the assignment problem as a set of constraints for a solution to be found. Specifying a set of constraints for a solution to be found is a form of declarative programming. In contrast, specifying a sequence of steps for finding a solution is imperative programming. The number of constraints used in declarative programming is typically small when compared to the number of steps used in imperative programming. If there is a change to the applications and/or VMs, a small number of constraints (rather than a large number of steps) need to be updated. Hence, the data model is highly scalable to adapt to various objectives of an assignment problem.

In an embodiment, the data model includes a constraint that limits assignment of any particular application to a VM corresponding to a tenant associated with the particular application. The data model includes a constraint that limits assignment of applications of a same application group to VMs executing on a same machine. The data model includes a constraint that limits assignment of applications of a same application group to different VMs. The data model includes a constraint that limits a number of applications assigned to a particular VM to a maximum capacity of the particular VM. The data model includes a constraint that limits a number of applications assigned to a particular machine to a maximum capacity of the particular machine.

In an embodiment, the data model includes a search directive that directs the constraint programming solver to find a solution by minimizing a maximum load across the VMs. The data model includes a search directive that directs the constraint programming solver to find a solution by prioritizing assignment of applications to VMs over the assignment of other variables in the data model.

One or more embodiments described in this Specification and/or recited in the claims may not be included in this General Overview section.

2. Architectural Overview

FIG. 1A illustrates a data model generation system 100, in accordance with one or more embodiments. As illustrated in FIG. 1A, system 100 includes data model generator 102 and constraint programming solver 104. System 100 also includes tenant(s) 112, application group(s) 114, and applications 116a-116b. System 100 also includes machine(s) 122, and virtual machines 126a-126b. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, application 116a and/or application 116b (referred to herein as "application 116") includes a set of commands and/or instructions to be executed by virtual machine 126a and/or virtual machine 126b (referred to herein as "virtual machine 126") of a computer network. As an example, an application may be a set of commands and/or instructions for generating an index of a particular set of data records.

In one or more embodiments, application group 114 is a logical grouping of applications 116. Applications of a same application 114 group are associated with a same set of data records. Applications 116 of a same application group 114 are associated with a same tenant 112.

In an embodiment, a set of data records may include multiple datasets. Different applications 116 may be used to process the various datasets. Since the datasets are associated with a same set of data records, the different applications 116 are classified as being in a same application group 114.

In another embodiment, a set of data records are stored in multiple partitions or shards of a database. Different applications 116 are used to process the datasets stored in the various partitions or shards. Since the datasets are associated with a same set of data records, the different applications 116 are classified as being in a same application group 114.

As an example, a computer network may implement a Sales Database corresponding to a particular tenant. The computer network may execute multiple applications for indexing records of the Sales Database. One application may index records corresponding to the United States. Another application may index records corresponding to Canada. Another application may index records associated a high security level. Another application may index records associated with a low security level. Since all these applications are related to the same set of data records (the Sales Database), these applications may be classified in a same application group.

In one or more embodiments, tenant 112 is an entity, such as an individual or a corporation, that is associated with one or more client devices configured for accessing a computer network. The client devices transmit requests for applications 116 to be executed by virtual machines 126 of the computer network. Each tenant 112 is independent from other tenants 112. For example, a business or operation of one tenant may be separate from a business or operation of another tenant. Each tenant may require different levels of computing services to be provided by the computer network.

Each application 116 is associated with a tenant identifier 118a or tenant identifier 118b (referred to herein as "tenant ID 118"), a group identifier 120a or group identifier 120b (referred to herein as "group identifier 120"), and an application identifier 121a or application identifier 121b (referred to herein as application ID 121").

In an embodiment, a set of tenant IDs 118 are indexes corresponding to tenants 112 of a computer network. Tenants 112 of the computer network are indexed consecutively. The number of tenant IDs 118 is equal to the number of tenants 112.

In an embodiment, a set of group IDs 120 are indexes corresponding to application groups 114 of a particular tenant 112. Application groups 114 of different tenants 112 are indexed using separate sets of group IDs 120. Application groups 114 of a same particular tenant 112 are indexed consecutively. The number of group IDs 120 associated with the particular tenant is equal to the number of application groups 114 associated with the particular tenant.

Figure 1B:
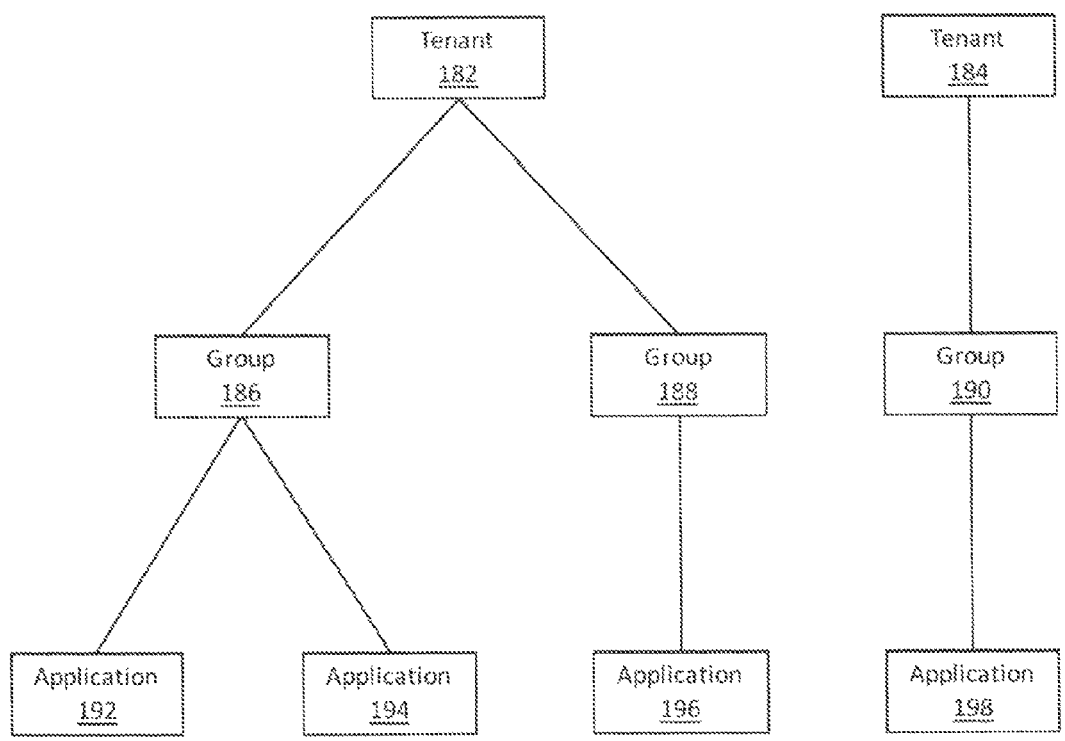
FIG. 1B illustrates examples of tenants, application groups, and applications, in accordance with one or more embodiments.

In an embodiment, a set of application IDs 121 are indexes corresponding to applications 116 of a particular application group 114. Applications 116 of different application groups 114 are indexed using separate sets of application IDs 121. Applications 116 of a same particular application group 114 are indexed consecutively. The number of application IDs 121 associated with the particular application group 114 is equal to the number of applications 114 associated with the particular application group 114. A particular application 116 is identified by a tuple of indexes: tenant ID 118, group ID 120, and application ID 121. FIG. 1B illustrates examples of tenants 112, application groups 114, and applications 116.

Referring to FIG. 1B, a computer network may be shared by tenants 182-184. A set of tenant IDs 118 may include: Tenant ID 0 for tenant 182, and Tenant ID 1 for tenant 184.

Continuing the example, tenant 182 may be associated with application groups 186-188. Tenant 184 may be associated with application group 190. A set of group IDs corresponding to tenant 182 may include: Group ID 0 for group 186, and Group ID 1 for group 188. Another set of group IDs corresponding to tenant 184 may include: Group ID 0 for group 190.

Group 186 may include applications 192-194. Group 188 may include application 196. Group 190 may include application 198. A set of application IDs corresponding to group 186 may include: Application ID 0 for application 192, and Application ID 1 for application 194. Another set of application IDs corresponding to group 188 may include: Application ID 0 for application 196. Another set of application IDs corresponding to group 190 may include: Application ID 0 for application 198.

In this example, application 192 is identified by the following tuple of indexes: (Tenant ID 0, Group ID 0, Application ID 0). Application 194 is identified by: (Tenant ID 0, Group ID 0, Application ID 1). Application 196 is identified by: (Tenant ID 0, Group ID 1, Application ID 0). Application 198 is identified by: (Tenant ID 1, Group ID 0, Application ID 0).

Referring back to FIG. 1A, in one or more embodiments, virtual machine (VM) 126 is a virtual resource of a computer network. Each VM 126 is configured to execute one or more applications 116.

Each VM 126 is associated with a maximum capacity (such as, capacities 128a-128b). The maximum capacity of a particular VM 126 is a maximum number of applications 116 that may be assigned to the particular VM 126. Each VM 126 of a computer network may be associated with a different capacity. As an example, capacity 128a may be different from capacity 128b.

Each VM 126 is identified by a unique identifier (VM ID). Each VM ID may be an index corresponding to a particular VM. Each VM 126 may either be already executed by a machine 122, or may be initiated by a machine 122.

In one or more embodiments, machine 122 is a digital device in a computer network. Machine 122 is configured to host one or more VMs 126. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

Each machine 122 is associated with a maximum capacity 124. The maximum capacity of a particular machine 122 is a maximum number of applications 116 that may be assigned to the particular machine 122. A number of applications 116 assigned to the particular machine 122 is a total number of applications 116 assigned to each VM 126 hosted by the particular machine 122. Each machine 122 of a computer network may be associated with a different maximum capacity 124.

Each machine 122 is identified by a unique identifier (Machine ID). Each Machine ID may be an index corresponding to a particular machine.

In one or more embodiments, machines of a computer network are consecutively indexed. Additionally, VMs hosted by the machines are consecutively indexed across the consecutively-indexed machines. As an example, a computer network may include Machine A and Machine B. Machine A may host VM C and VM D. Machine B may host VM E. Machine A may be indexed with Machine ID 0. Machine B may be indexed with Machine ID 1. VM A may be indexed with VM ID 0. VM B may be indexed with VM ID 1. VM C may be indexed with VM ID 2.

In one or more embodiments, VMs 126 and machines 122 form a cloud computing network. A cloud computing network provides a pool of resources that are shared amongst multiple client devices. Examples of resources include a processor, a server, a data storage device, a virtual machine (VM), a platform, and/or a software application. Client devices may independently request computing services, such as server time and network storage space, as needed. Client devices may independent request computing services for the processing of applications 116. The resources may be dynamically assigned to the requests and/or client devices on an on-demand basis.

Further, the cloud computing network may be shared amongst multiple tenants 112. The cloud computing network stores and/or processes data corresponding to the multiple tenants 112. The cloud computing network may implement tenant isolation for the data. Data corresponding to a particular tenant is only accessible by the particular tenant. Additional embodiments and/or examples relating to cloud computing networks are described below in Section 5, titled "Cloud Computing Networks."

In one or more embodiments, information describing tenant(s), application group(s) 114, applications 116, machine(s) 122, capacity(s) 124, VMs 126, and/or capacities 128a-128b are stored in one or more data repositories (not illustrated). A data repository is any type of storage unit and/or device (e.g., a file system, database, collection of tables, or any other storage mechanism) for storing data. A data repository may include multiple different storage units and/or devices. The multiple different storage units and/or devices may or may not be of the same type or located at the same physical site. Further, a data repository may be implemented or may execute on the same computing system as data model generator 102. Alternatively or additionally, a data repository may be implemented or executed on a computing system separate from data model generator 102. The data repository may be communicatively coupled to data model generator 102 via a direct connection or via a network. Additionally or alternatively, a data repository may be associated with any component within system 100.

In one or more embodiments, data model generator 102 refers to hardware and/or software configured to perform operations described herein for generating a data model 130, for application to constraint programming solver 104, for assigning applications 116 to VMs 126. Assignments of applications to VMs must achieve one or more of the following objectives:

(a) Each application 116 assigned to a particular VM 126 corresponds to a same tenant 112;

(b) Each application 116 of a particular application group 114 is assigned to a VM 126 hosted by a same machine 122;

(c) Each application 116 of a particular application group 114 is assigned to different VMs 126;

(d) The number of applications 116 assigned to a particular VM 126 (also referred to herein as a "load" of the particular VM) does not exceed the maximum capacity (such as, maximum capacities 128a-128b) of the particular VM 126;

(e) The number of applications 116 assigned to a particular machine 122 (also referred to herein as a "load" of the particular machine) does not exceed the maximum capacity 124 of the particular machine 122; and (f) The load of each VM 126 is balanced across the VMs 126.

Data model generator 102 may be implemented on one or more digital devices. Examples of operations performed by data model generator 102 for generating data model 130 are described below with reference to FIGS. 2A-2C.

Data model 130 refers to a particular organization, structure, and/or representation of information. Data model includes one or more data model element(s) 132, constraint(s) 134, and search directive(s) 136.

Figure 1C:
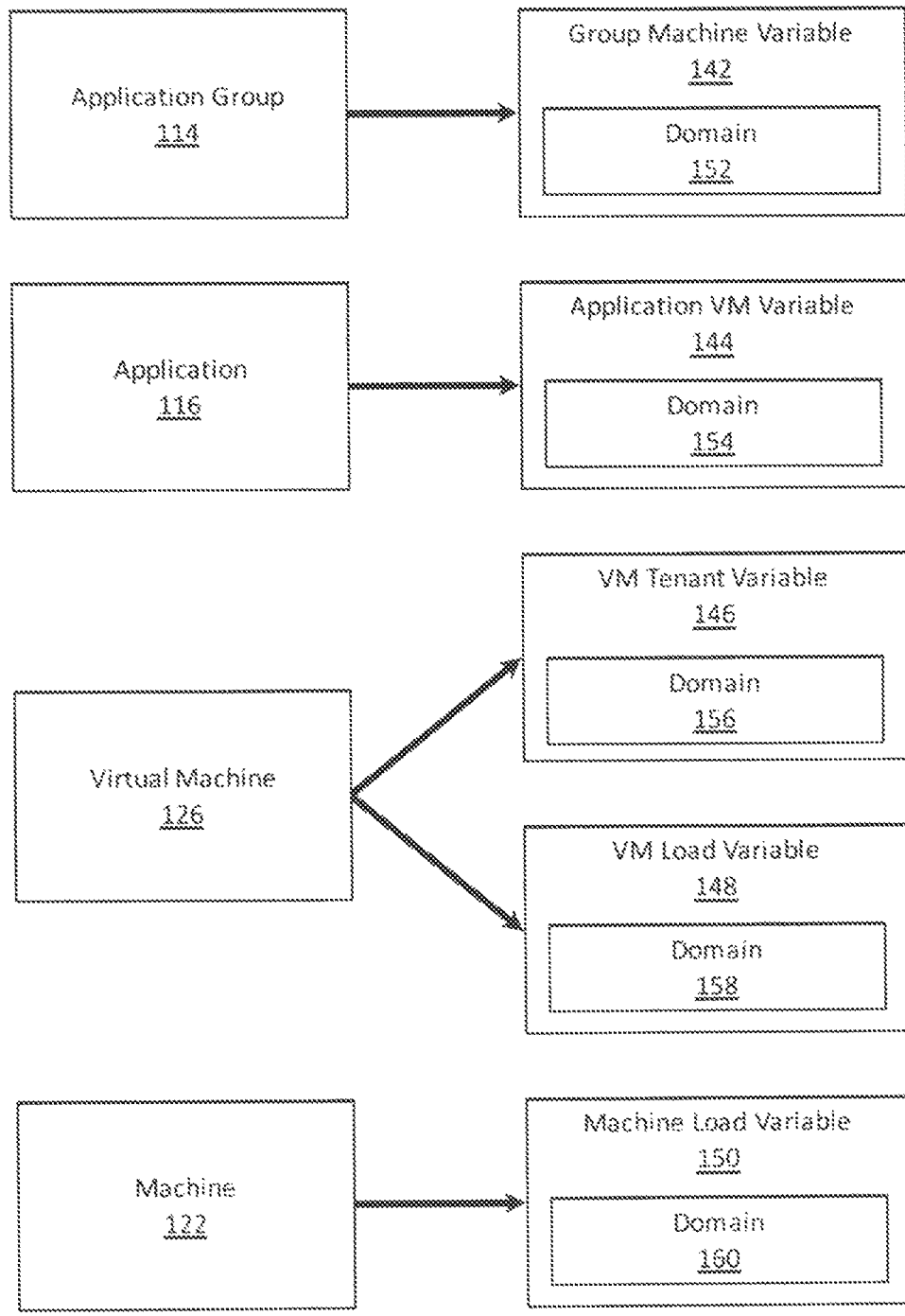
FIG. 1C illustrates examples of data model elements, in accordance with one or more embodiments.

Data model element 132 represents a specific piece of information within data model 130. Data model element 132 may be a decision variable (also referred to herein as a "variable") or a domain corresponding to a decision variable. A decision variable represents an assignment corresponding to one of the following: a tenant 112, an application group 114, an application 116, a VM 126, or a machine 122. A particular decision variable may assume one of the values included in the domain of the particular decision variable. The value assumed by the particular decision variable, as determined by constraint programming solver 104, determines a particular assignment for the corresponding tenant 112, application group 114, application 116, VM 126, or machine 122. FIG. 1C illustrates examples of data model elements 132.

Each Application VM variable 144 corresponds to an application 116. Each Application VM variable 144 represents an assignment of a VM 126 to the corresponding application 116. Domain 154 represents candidate values that may be assigned to the corresponding application 116. Domain 154 includes identifiers of the VMs 126 (for example, VM IDs) in a computer network. The value assumed by Application VM variable 144 identifies a particular VM 126 that is assigned to the corresponding application 116.

Each Application VM variable 144 is identified using the same tuple of indexes as the corresponding application 116. A set of Application VM variables 144 may be expressed as VM[Tenant ID, Group ID, Application ID)]. For example, VM[1, 1, 1] may be the Application VM variable corresponding to the application identified by the tuple of indexes [Tenant ID 1, Group ID 1, Application ID 1]. The value assumed by VM[1, 1, 1] may identify the VM that is assigned to the application identified by the tuple of indexes [Tenant ID 1, Group ID 1, Application ID 1].

Each VM Tenant variable 146 corresponds to a VM 126. Each VM Tenant variable 146 represents an assignment of a tenant 112 to the corresponding VM 126. Domain 156 represents candidate values that may be assigned to the corresponding VM 126. Domain 156 includes identifiers of the tenants 112 (for example, tenant IDs 118) in a computer network. The value assumed by VM Tenant variable 146 identifies a particular tenant 112 that is assigned to the VM 126. Additionally, domain 154 may also include a null value that does not correspond to any tenant 112. Assumption of the null value by VM Tenant variable 126 indicates that no tenant 112 is assigned to the corresponding VM 126.

Each VM Tenant variable 146 is identified using the same index as the corresponding VM 126. A set of VM Tenant variables 146 may be expressed as Tenant[VM ID]. For example, Tenant[2] may be the VM Tenant variable corresponding to the VM identified by VM ID 2. The value assumed by Tenant[2] identifies a tenant assigned to the VM identified by VM ID 2.

Each Group Machine variable 142 corresponds to an application group 114. Each Group Machine variable represents an assignment of a machine 122 to the corresponding application group 114. Domain 152 represents candidate values that may be assigned to the corresponding application group 114. Domain 152 includes identifiers of the machines 122 (for example, machine IDs) in a computer network. The value assumed by Group Machine variable 142 identifies a particular machine 122 that is assigned to the corresponding application group 114.

Each Group Machine variable 142 is identified using the same pair of indexes as the corresponding application group 114. A set of Group Machine variables 142 may be expressed as Machine[Tenant ID. Group ID].

Each VM Load variable 148 corresponds to a VM 126. Each VM Load variable represents an assignment of a load to the corresponding VM 126. Domain 158 represents candidate values that may be assigned to the VM 126. Domain 158 includes a range of numbers starting from zero (0) to the maximum capacity of the VM 126. Domain 158 of different VM Load variables 148 may be different. The value assumed by VM Load variable 148 identifies a particular load that is assigned to the corresponding VM 126.

Each VM Load variable 148 is identified using the same index as the corresponding VM 126. A set of VM Load variable 148 may be expressed as VMLoad[VM ID].

Each Machine Load variable 150 corresponds to a machine 122. Each Machine Load variable 150 represents an assignment of a load to the corresponding machine. Domain 160 represents candidate values that may be assigned to the machine 122. Domain 160 includes a range of numbers starting from zero (0) to the maximum capacity 124 of the machine 122. Domain 160 of different Machine Load variables 150 may be different. The value assumed by Machine Load variable 150 identifies a particular load that is assigned to the corresponding machine 122.

Each Machine Load variable 150 is identified using the same index as the corresponding machine 122. A set of Machine Load variables 150 may be expressed as MachineLoad[Machine ID].

Referring back to FIG. 1A, constraint 134 is a property required by a solution of the assignment problem. Examples of operations for specifying constraints 134 are described below with reference to FIGS. 2A and 2B.

In an embodiment, a constraint 134 may be specified in the form of an "element constraint." An element constraint is specified using one set of decision variables to index into another set of decision variables.

The following illustrates an example of an element constraint. The application identified by the tuple of indexes [Tenant ID 0, Group ID 3, Application ID 0] is used in this example. An element constraint may use a set of Application VM variables to index into a set of VM Tenant variables. The Application VM corresponding to the application identified by [Tenant ID 0, Group ID 3, Application ID 0] is VM[0, 3, 0]. Using VM[0, 3, 0] to index into the set of VM Tenant variables retrieves a particular VM Tenant variable corresponding to the VM assigned to the application identified by [Tenant ID 0, Group ID 3, Application ID 0].

Continuing the example, the element constraint may be expressed as Tenant[VM[0, 3, 0]]. The element constraint may be analyzed from the inner decision variable to the outer decision variable. In this example, the inner decision variable is VM[ ]. In particular, VM[0, 3, 0] identifies a particular Application VM variable corresponding to the application identified by [Tenant ID 0, Group ID 3, Application ID 0]. The value assumed by the particular Application VM variable identifies the VM assigned to the application identified by [Tenant ID 0, Group ID 3, Application ID 0]. Further, the outer decision variable is Tenant[ ]. In particular, Tenant[VM[0, 3, 0]] identifies a particular VM Tenant variable corresponding to the VM assigned to the application identified by [Tenant ID 0, Group ID 3, Application ID 0]. The value assumed by the particular VM Tenant variable identifies the tenant assigned to the VM assigned to the application identified by [Tenant ID 0, Group ID 3, Application ID 0].

Search directive 136 is a directive that guides constraint programming solver 104 in the process of determining a solution to the assignment problem. Search directive 136 specifies a preferred solution for the assignment problem. Additionally or alternatively, search directive 135 specifies a preferred way to determine a solution for the assignment problem. Examples of operations for specifying search directives 136 are described below with reference to FIGS. 2A and 2C.

Data model 130 may be implemented as a software data structure. The software data structure is readable by a machine. The software data structure may be an input parameter into a hardware and/or software component, such as constraint programming solver 104. Data model element(s) 132 are implemented as data structure elements within the software data structure. Examples of data structure elements include an array, a vector, a linked list, a table, a software variable, a constant, and/or other software data objects. As an example, Application VM variable 144 may be implemented as an array. Elements of the array correspond to domain 154 of Application VM variable 144.

In one or more embodiments, constraint programming solver 104 refers to hardware and/or software configured to perform operations described herein for returning assignments of applications to VMs 140 based on data model 130. Constraint programming solver 104 may be configured to apply constraint programming algorithms well-known in the art, such as backtracking and forward checking. Constraint programming solver 104 may be implemented on one or more digital devices. Data model generator 102 and constraint programming solver 104 may be implemented on a same digital device or different digital devices.

Figure 2A:
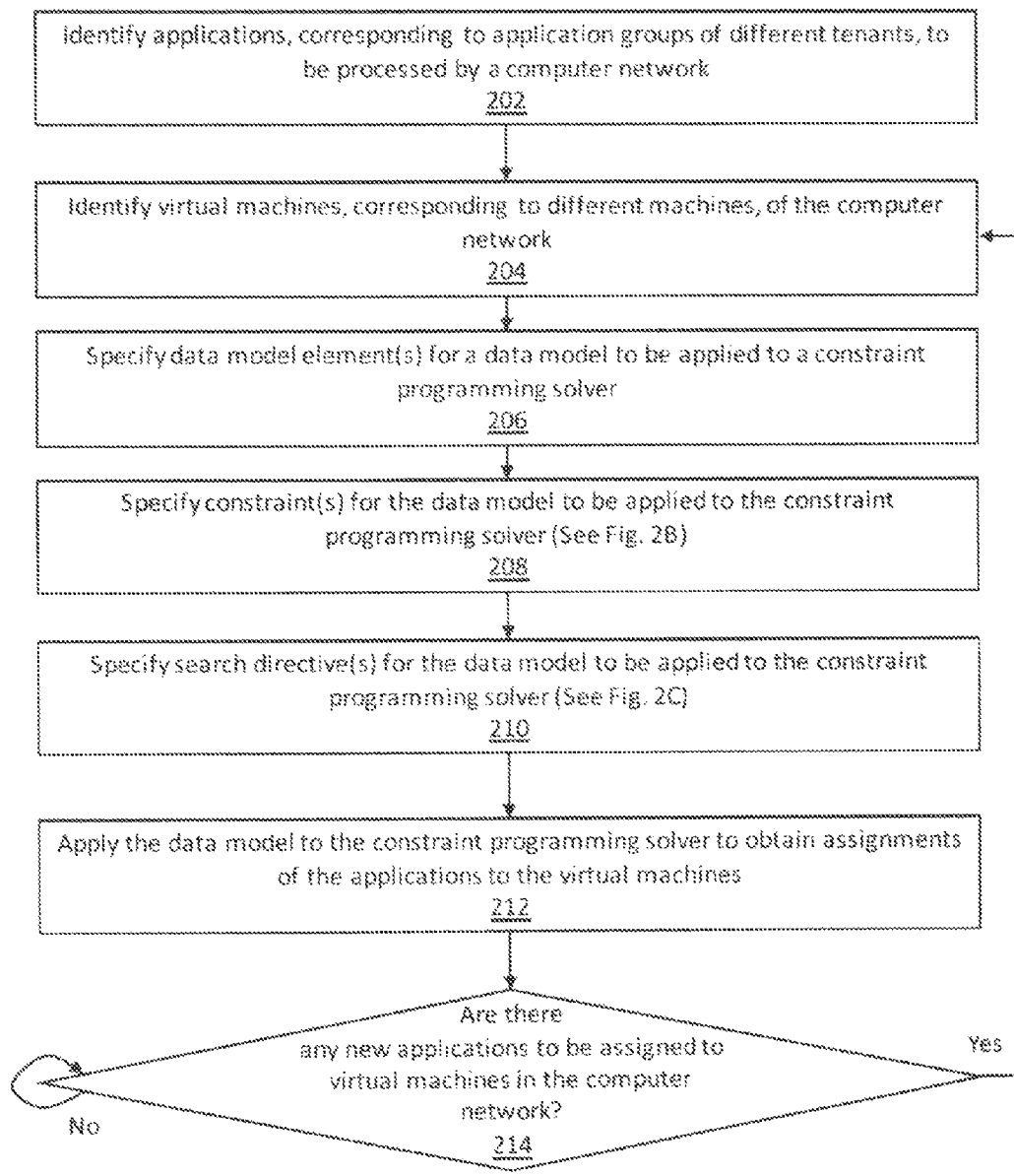
FIGS. 2A-2C illustrate an example set of operations for generating a data model for application to a constraint programming solver for assigning applications to virtual machines, in accordance with one or more embodiments.
Figure 2B:
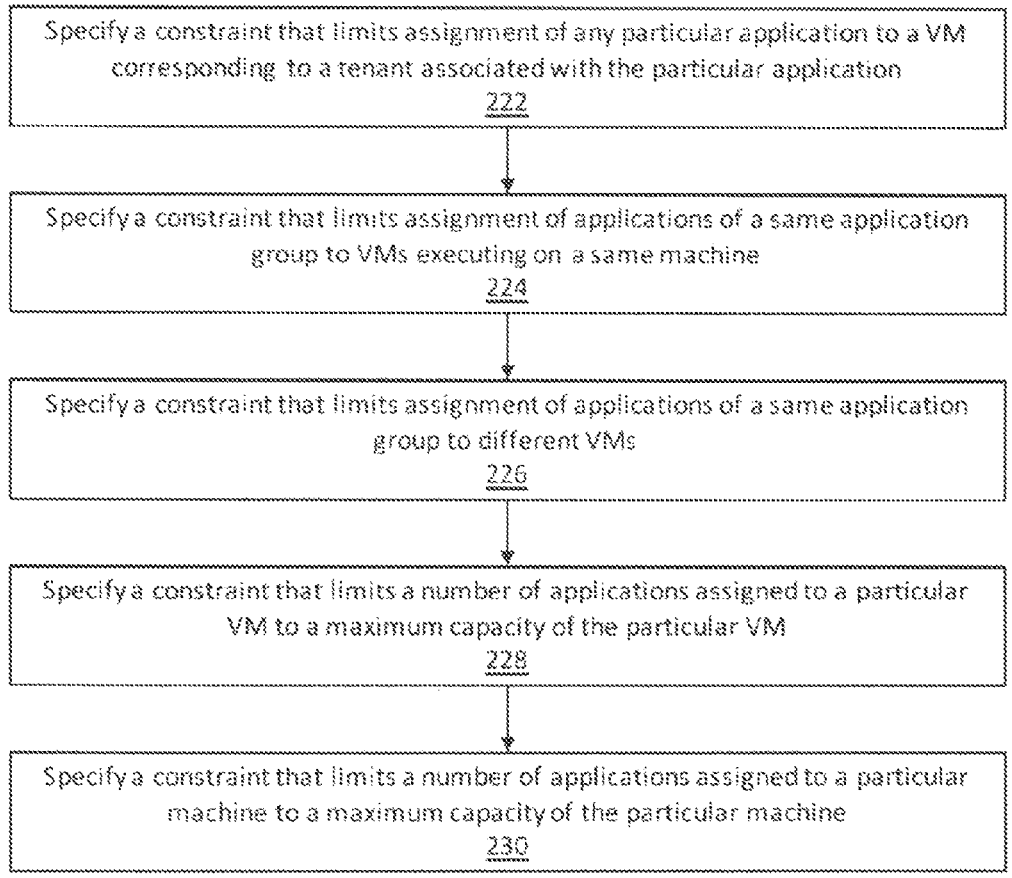
Figure 2C:
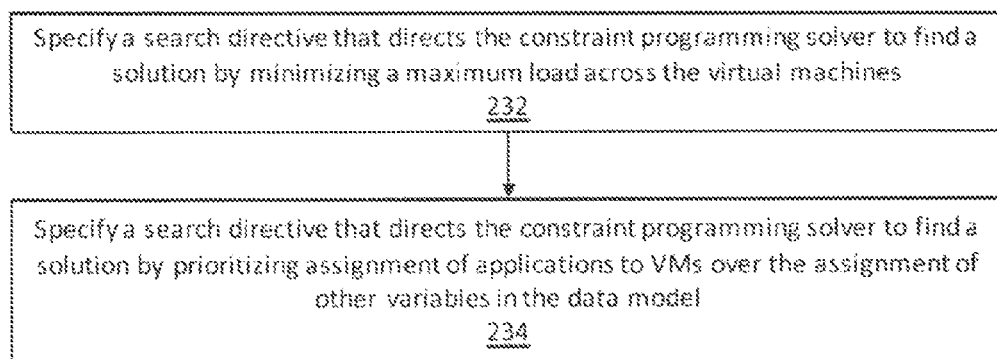

3. Generating a Data Model for Application to a Constraint Programming Solver for Assigning Applications to Virtual Machines FIGS. 2A-2C illustrates an example set of operations for generating a data model for application to a constraint programming solver, in accordance with one or more embodiments. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

A. Specifying Data Model Elements

One or more embodiments include identifying applications, corresponding to application groups of different tenants, to be processed by a computer network (Operation 202). Client devices accessing the computer network transmit requests for processing the applications. The computer network may be a multi-tenant cloud computing network.

A data model generator 102 obtains information identifying the applications to be processed from a component of the computer network. As an example, a gateway of the computer network may receive the requests for processing the applications from client devices. The data model generator 102 may obtain information identifying the applications from the gateway. As another example, the data model generator 102 may intercept the requests for processing the applications transmitted from client devices to the computer network. As another example, the data model generator 102 may directly receive the requests for processing the applications from client devices.

Additionally or alternatively, the data model generator 102 obtains information identifying the applications to be processed from another application and/or database. Additionally or alternatively, the data model generator 102 obtains information identifying the applications to be processed from user input entered by a user via a user interface.

Further, the data model generator 102 obtains information identifying the tenant and application group associated with each application. The obtained information may include, for example, a name and/or a unique identifier of the associated tenant and the associated application group.

Based on the information identifying the tenants, application groups, and applications, the data model generator 102 assigns a tuple of indexes to each application. The tuple of indexes includes an index for the tenant, an index for the application group, and an index for the application. The tenants of the computer network are indexed consecutively. The application groups of different tenants are indexed separately. The application groups of a particular tenant are indexed consecutively. The applications of different application groups are indexed separately. The applications of a particular application group are indexed consecutively. The tuple of indexes are also referred to herein as a tenant ID, a group ID, and an application ID. Examples of tenant ID, group ID, and application ID are described above with reference to FIGS. 1A-1B.

One or more embodiments include identifying virtual machines (VMs), corresponding to different machines, of the computer network (Operation 204). The computer network maintains information identifying the machines of the computer network. The computer network also maintains information identifying the VMs hosted by the machines and/or the VMs that may be initiated by the machines. As an example, the computer network may maintain a log of which VMs are hosted by which machines.

The data model generator 102 obtains the information identifying the VMs and machines from a component of the computer network. Additionally or alternatively, the data model generator 102 obtains information identifying the VMs and machines from another application and/or database. Additionally or alternatively, the data model generator

102 obtains information identifying the VMs and machines from user input entered by a user via a user interface.

The data model generator 102 assigns an index to each machine and each VM. The machines of the computer network are consecutively indexed. The VMs are consecutively indexed across the consecutively-indexed machines. The index of a machine is also referred to herein as a machine ID. The index of a VM is also referred to herein as a VM ID. Examples of machine ID and VM ID are described above with reference to FIG. 1A.

One or more embodiments include specifying one or more data model elements for a data model to be applied to a constraint programming solver (Operation 206).

The data model generator 102 specifies a set of Application VM variables. Each Application VM variable represents an assignment of a VM to a particular application identified at Operation 202. The domain of each Application VM variable includes the VM IDs of the VMs identified at Operation 204.

In an embodiment, the data model generator 102 assigns a tuple of indexes to each Application VM variable. The same tuple of indexes is used to reference a particular application and the Application VM variable corresponding to the particular application. As an example, a particular application may be identified using the tuple [Tenant ID 1, Group ID 1, Application ID 2]. A data model generator may specify a particular Application VM variable representing an assignment of a VM to the particular application. The data model generator may assign a same tuple of indexes [Tenant ID 1, Group ID 1, Application ID 2] to the particular Application VM variable.

Additionally or alternatively, the data model generator 102 specifies a set of VM Tenant variables. Each VM Tenant variable represents an assignment of a tenant to a particular VM identified at Operation 204. The domain of each VM Tenant variable includes the tenant IDs of the tenants identified at Operation 202. The domain of each VM Tenant variable may further include a null value that does not correspond to any tenant.

In an embodiment, the data model generator 102 assigns an index to each VM Tenant variable. The same index is used to reference a particular VM and the VM Tenant variable corresponding to the particular VM.

In an embodiment, the set of "Tenant of VMs" variables is specified based on an objective of the assignment problem. As described above, one objective is that each application assigned to a particular VM corresponds to a same tenant. Hence, each VM may be associated with only one tenant, or no tenant at all. The assignment of one or zero tenants to a particular VM is represented by a VM Tenant variable.

Additionally or alternatively, the data model generator 102 specifies a set of Group Machine variables. Each Group Machine variable represents an assignment of a machine to a particular application group identified at Operation 202. The domain of each Group Machine variable includes the machine IDs of the machines identified at Operation 204.

In an embodiment, the data model generator 102 assigns a pair of indexes to each Group Machine variable. The same pair of indexes is used to reference a particular application group and the Group Machine variable corresponding to the particular application group. As an example, a particular application group may be identified using the pair of indexes [Tenant ID 1, Group ID 2]. A data model generator may specify a particular Group Machine variable representing an assignment of a machine to the particular application group.

The data model generator may assign a same pair of indexes [Tenant ID 1, Group ID 2] to the particular Group Machine variable.

In an embodiment, the set of Group Machine variables is specified based on an objective of the assignment problem. As described above, one objective is that each application of a particular application group be assigned to a VM hosted by a same machine. Hence, each application group may be associated with only one machine. The assignment of one machine to a particular application group is represented by a Group Machine variable.

Additionally or alternatively, the data model generator 102 specifies a set of VM Load variables. Each VM Load variable represents an assignment of a load to a particular VM identified at Operation 204. The domain of each VM Load variable includes a set of consecutive numbers, ranging from zero (0) to the maximum capacity of the corresponding VM.

As an example, a computer network may include VM A and VM B. The maximum capacity of VM A may be two (2). The maximum capacity of VM B may be three (3). A VM Load variable corresponding to VM A may include the following domain: {0, 1, 2}. A VM Load variable corresponding to VM B may include the following domain: {0, 1, 2, 3}.

In an embodiment, the data model generator 102 assigns an index to each VM Load variable. The same index is used to reference a particular VM and the VM Load variable corresponding to the particular VM.

Additionally or alternatively, the data model generator 102 specifies a set of Machine Load variables. Each Machine Load variable represents an assignment of a load to a particular machine identified at Operation 204. The domain of each Machine Load variable includes a set of consecutive numbers, ranging from zero (0) to the maximum capacity of the corresponding machine.

As an example, a computer network may include Machine A and Machine B. The maximum capacity of Machine A may be three (3). The maximum capacity of Machine B may be two (2). A Machine Load variable corresponding to Machine A may include the following domain: {0, 1, 2, 3}. A Machine Load variable corresponding to Machine B may include the following domain: {0, 1, 2}.

In an embodiment, the data model generator 102 assigns an index to each Machine Load variable. The same index is used to reference a particular machine and the Machine Load variable corresponding to the particular machine.

B. Specifying Constraints

One or more embodiments include specifying one or more constraints for the data model to be applied to the constraint programming solver (Operation 208). FIG. 2B illustrates an example set of operations for specifying the constraints. One or more of the constraints illustrated in FIG. 2B may be specified. Additional and/or alternative constraints may further be specified.

One or more embodiments include specifying a constraint that limits assignment of any particular application to a VM corresponding to a tenant associated with the particular application (Operation 222). The data model generator 102 specifies the constraint as an element constraint including the set of Application VM variables and the set of VM Tenant variables.

The element constraint uses the set of Application VM variables to index into the set of VM Tenant variables. Using the set of Application VM variables to index into the set VM Tenant variables may be expressed as: Tenant[VM[Tenant ID, Group ID, Application ID]]. The value assumed by Tenant[VM[1, 1, 1]], for example, identifies a particular tenant assigned to the VM assigned to the application identified by the tuple of indexes [Tenant ID 1, Group ID 1, Application ID 1].

The data model generator 102 specifies an element constraint that requires Tenant[VM[Tenant ID, Group ID, Application ID]] to be equal to the Tenant ID. The element constraint may be expressed as:

Tenant[VM[Tenant ID, Group ID, Application ID]]= Tenant ID, for all Tenant IDs, Group IDs, and Application IDs.

Referring to Tenant[VM[1, 1, 1]], for example, the constraint may require that a tenant ID of the particular tenant assigned to the VM assigned to the application identified by the tuple of indexes [Tenant ID 1, Group ID 1, Application ID 1] must be equal to Tenant ID 1.

One or more embodiments include specifying a constraint that limits assignment of applications of a same application group to VMs executing on a same machine (Operation 224). The data model generator 102 specifies the constraint by limiting a relationship between the set of Application VM variables and the set of Group Machine variables.

The data model generator 102 specifies the constraint by defining an upper bound and a lower bound for the VM IDs of VMs that may be assigned to a particular application. Since as described above the value assumed by a Application VM variable is the VM ID of the VM assigned to the corresponding application, the data model generator specifies the constraint using the set of Application VM variables. The constraint may be expressed as follows:

lowerBound<VM[Tenant ID, Group ID, Application ID]≤upperBound, for all Tenant IDs, Group IDs, and Application IDs.

The data model generator 102 specifies a different lower bound for each application, based on the particular machine assigned to the application group associated with the application. As described above, the VMs are consecutively indexed across consecutively-indexed machines. A lower bound of the VM ID of a VM that may be assigned to a particular application is equal to the number of VMs hosted by machines having a machine ID less than the machine ID of the particular machine assigned to the application group associated with the particular application. The machine ID of the particular machine assigned to the application group associated with the particular application is a value assumed by the Group Machine variable corresponding to the application group associated with the particular application.

The data model generator 102 may determine the lower bound by adding the number of VMs hosted by each machine having a Machine ID less than a value assumed by the Group Machine variable corresponding to the application group associated with the particular application. Additionally or alternatively, the number of VMs hosted by each machine may be the same. The data model generator may determine the lower bound by multiplying the number of VMs per machine with the number of machines having a Machine ID less than a value assumed by the Group Machine variable corresponding to the application group associated with the particular application. The determination may be expressed as follows:

lowerBound=(number of VMs per machine)×(Machine[Tenant ID, Group ID]−1).

The data model generator 102 specifies a different upper bound for each application, based on the particular machine assigned to the application group associated with the application. An upper bound for a particular application is equal to the sum of (a) the lower bound for the particular application and (b) the number of VMs hosted by the machine assigned to the application group associated with the particular application. The determination may be expressed as follows:

upperBound lowerBound+(number of VMs for Machine[Tenant ID, Group ID]).

One or more embodiments include specifying a constraint that limits assignment of applications of a same application group to different VMs (Operation 226). The data model generator 102 specifies the constraint by using the set of Application VM variables. Specifically, the constraint requires that a subset of Application VM variables corresponding to applications of a same application group must be different. Applications of a same application group (i.e., having a same Tenant ID and a same Group ID) may be referred to herein using the pair of indexes corresponding to the Tenant ID and the Group ID, as follows: VM[Tenant ID, Group ID]. The constraint may be expressed as:

AllDifferent(VM[Tenant ID, Group ID]), for all Tenant IDs and Group IDs.

The function AllDifferent applied on a set of decision variables requires that the value assumed by the set of decision variables be different. In the expression above, given a particular tenant ID and a particular group ID, the AllDifferent function requires that the VM assigned to each application with the particular tenant ID and the particular group ID be different.

One or more embodiments include specifying a constraint that limits a number of applications assigned to a particular VM to a maximum capacity of the particular VM (Operation 228). The data model generator 102 specifies the constraint using the set of Application VM variables and the set of VM Load variables.

The data model generator 102 specifies the constraint using a global cardinality constraint (referred to herein as "GCC"). The GCC accepts three parameters: (a) a set of variable elements, (b) a set of value elements, and (c) a set of counting elements.

The set of variable elements is one of the sets of decision variables of the data model. Each decision variable assumes a value in the corresponding domain. A decision variable may not assume a value that is not in the corresponding domain.

The set of value elements is a list of values that may be assigned to any of the set of variable elements. The set of value elements may include all or a subset of values in any of the domains of the variable elements.

The set of counting elements is a set of counters, each corresponding to one of the set of value elements. Each counter counts a number of times that the corresponding value (from the set of value elements) is assumed by any of the variable elements.

Each counting element is associated with a corresponding domain. Each counting element assumes a value in the corresponding domain. A counting element may not assume a value that is not in the corresponding domain. Based on the set of counting elements, the GCC limits the number of times that a particular value (from the set of value elements) may be assumed by any of the variable elements.

The data model generator 102 inputs the set of Application VM variables, the set of VM Load variables, and a list of VM IDs as parameters into the GCC. The set of Application VM variables is the set of variable elements of the GCC. The list of VM IDs of the VMs in the computer network is the set of value elements of the GCC. The set of VM Load variables is the set of counting elements of the GCC.

Based on the function of the GCC, each Application VM variable may assume a value in the corresponding domain. As described above, a domain of a Application VM variable is the VM IDs of the VMs in the computer network.

Further based on the function of the GCC, the VM Load variable counts a number of times that each value element is assumed by any variable element. The VM Load variable counts a number of times that each VM ID is assumed by any Application VM variable. The number of times that a particular VM ID is assumed by any Application VM variable is the load of the VM identified by the particular VM ID.

Further based on the function of the GCC, each VM Load variable may assume a value in the corresponding domain. As described above, a domain of a VM Load variable includes numbers ranging from zero (0) to the maximum capacity of the VM. Hence, a particular VM may not be assigned a number of times greater than the maximum capacity of the particular VM.

The constraint may be expressed as:

GCC(VM[Tenant ID, Group ID, Application ID],
{all VM IDs}, VMLoad[VM ID]).

In an alternative embodiment, the applications to be processed by the computer network each require a different level of resources and/or computing services. Each VM is associated with a maximum level of computing services that the VM is capable of providing. The data model generator 102 specifies a set of decision variables (referred to herein as a set of "VM Services variables") representing an assignment of a level of computing services to each VM. The domain of each VM Services variable includes a set of consecutive numbers, ranging from zero (0) to the maximum level of computing services provided by the corresponding VM. The data model generator 102 specifies a constraint that limits a number of applications assigned to a particular VM to a maximum capacity of the particular VM. The data model generator 102 specifies the constraint using a sum function. The sum of the level of computing services used by each application assigned to a particular VM must be equal to the VM Services variable corresponding to the particular VM. The VM Services variable corresponding to the particular VM may only assume a value that is in the corresponding domain. The data model generator 102 may additionally use a bin packing operator and/or a resource scheduling operator.

One or more embodiments include specifying a constraint that limits a number of applications assigned to a particular machine to a maximum capacity of the particular machine (Operation 230). The data model generator 102 specifies the constraint using the set of Machine Load variables.

The data model generator 102 specifies that each Machine Load variable must be equal to the sum of the loads of all VMs hosted by the corresponding machine. Further, each Machine Load variable assumes a value in the corresponding domain. A Machine Load variable may not assume a value that is not in the corresponding domain. As described above, the domain of a Machine Load variable includes numbers ranging from zero (0) to the maximum capacity of the machine. The constraint may be expressed for as a separate formula for each particular machine, identified by each particular Machine ID. The formula may be expressed as:

MachineLoad[Machine ID]=sum(VMLoad[VM ID]), for all VM IDs of VMs hosted by the particular machine identified by the particular Machine ID.

C. Specifying Search Directives

Referring back to FIG. 2A, one or more embodiments include specifying one or more search directives for the data model to be applied to the constraint programming solver (Operation 210). FIG. 2C illustrates an example set of operations for specifying the search directives. One or more of the search directives illustrated in FIG. 2C may be specified. Additional and/or alternative search directives may further be specified. In an embodiment, no search directives are specified.

One or more embodiments include specifying a search directive that directs the constraint programming solver to find a solution by minimizing a maximum load across the VMs (Operation 232). The data model generator 102 specifies the search directive by using the set of VM Load variables.

The data model generator 102 uses a max function. The max function determines a maximum value assumed by a set of decision variables. The data model generator 102 applies the max function to the set of VM Load variables.

The data model generator 102 uses a min search directive. The min search directive, applied to a set of parameters, directs the constraint programming solver to find a solution that minimizes values of the set of parameters. The data model generator 102 applies the min search directive to the maximum value assumed by the set of VM Load variables, as determined by the max function. The search directive may be expressed as:

min(max(VMLoad[VM ID])).

Examples of applications of the min search directive is described below with reference to Operation 212.

In an embodiment, the data model generator 102 identifies a subset of assignments that need not be attempted by the constraint programming solver in determining a valid solution for the assignment problem. The subset of assignments excluded from consideration include assignments of a decision variable that are impossible for satisfying the constraints of the assignment problem.

The data model generator 102 identifies a subset of assignments for exclusion based on the function max (VMLoad[VM ID]). The data model generator 102 excludes assignments of the set of VM Load variables that cause a maximum value assumed by the set of VM Load variables to be less than the number of applications divided by the number of VMs. The excluded subset of assignments may be expressed as:

$$\max(VMLoad[VM\ ID]) \le \frac{(\text{Number of Applications})}{(\text{Number of VMs})}$$

The following example illustrates that why $$\frac{(\text{Number of Applications})}{\text{Number of VMs}}$$

is a lower bound for mar (VMLoad[VM ID]) for valid solutions of the assignment problem. As an example, a computer network may include thirty applications and five VMs. One set of assignments for consideration is even distribution of the applications across the VMs. This scenario results in six applications per VM. The maximum load across the VMs is six.

Continuing the example, another set of assignments for consideration is where the maximum load across the VMs is five, which is less than the number of applications divided by the number of VMs. The load of each VM is at most five. The five VMs serve at most twenty-five applications. Since five of the thirty applications remain unassigned, this scenario does not result in a valid solution to the assignment problem.

As illustrated in the above example, if the maximum load across the VMs is equal to or greater than the number of applications divided by the number of VMs, a valid solution may be determined. However, if the maximum load across the VMs is less than the number of applications divided by the number of VMs, then it would be impossible to find a valid solution.

Additionally or alternatively, the data model generator 102 excludes assignments of the set of VM Load variables that cause a maximum value assumed by the set of VM Load variables to be more than the maximum of the maximum capacity across the VMs. The excluded set of assignments may be expressed as:

max(VMLoad[VM ID])>max(VMCapacity[VM ID]), wherein VMCapacity[VM ID] represents the respective maximum capacity of each VM.

As described above, a valid solution requires that the load of each VM not exceed the maximum capacity of the VM. If the maximum load across the VMs exceeds the largest maximum capacity across the VMs, then it would be impossible to find a valid solution.

Conversely, rather than specifying assignments to be excluded from consideration, the data model generator 102 may specify a limited subset of assignments to be attempted by the constraint programming solver 104. The constraint programming solver 104 does not attempt any assignments that are not included in the specified limited subset. The limited subset of assignments for consideration may be expressed as:

$$\frac{\text{(Number of Applications)}}{\text{(Number of VMs)}} \leq$$

$$\max(VMLoad[VM\ ID]) \leq \max(VMCapacity[VM\ ID]).$$

One or more embodiments include specifying a search directive that directs the constraint programming solver to find a solution by prioritizing assignment of applications to VMs over the assignment of other variables in the data model (Operation 234). The data model generator 102 specifies the search directive by using the set of Application VM variables.

The data model generator 102 uses a branch search directive. The branch search directive, applied to a set of decision variables, directs the constraint programming solver to find a solution by prioritizing determining assignments of the set of decision variables over determining assignments of other sets of decision variables. The data model generator 102 applies the branch search directive to the set of Application VM variables. The search directive may be expressed as:

branch(VM[Tenant ID, Group ID, Application ID]).

Examples of applications of the branch search directive is described below with reference to Operation 212.

D. Generating and Updating a Data Model

Referring back to FIG. 2A, one or more embodiments include applying the data model to the constraint programming solver to obtain assignments of the applications to the VMs (Operation 212). The data model generator 102 inputs the data model as a parameter to a constraint programming solver 104.

The data model includes one or more of the following decision variables: the set of Application VM variables, the set of VM Tenant variables, the set of Group Machine variables, the set of VM Load variables, and the set of Machine Load variables. Additional or alternative decision variables may be included.

The data model includes one or more of the constraints specified in Operations 222-230 of FIG. 2B. Additional or alternative constraints may be included.

The data model includes one or more of the search directives specified in Operations 232-234 of FIG. 2C. Additional or alternative search directives may be included. In an embodiment, no search directives are specified.

The constraint programming solver 104 may be configured to apply one or more constraint programming algorithms that are well-known in the art. Constraint programming algorithms well-known in the art include, for example, backtracking and forward-checking algorithms.

A constraint programming solver 104 may process each Application VM variable sequentially to find a valid solution to the assignment problem. A domain of a current Application VM variable is identified. A value of the domain is temporarily assumed by the current Application VM variable. If this assumption violates at least one of the constraints included in the data model, then another value of the domain is temporarily assumed by the current Application VM variable. If all VMs in the domain are attempted and do not satisfy the constraints, then a re-assignment of a previous Application VM variable is made.

A value of the domain of the previous Application VM variable had been temporarily assumed by the previous Application VM variable. Based on the need for re-assignment, another value of the domain of the previous Application VM variable is temporarily assumed by the previous Application VM variable. Then, assignment of the current Application VM variable is reattempted.

The constraint programming solver 104 iterates through each Application VM variable, until each of the set of Application VM variables assumes a value of the corresponding domain, without violating the constraints included in the data model. The temporary assignments are determined to be final assignments. The final assignments are returned as a valid solution to the assignment problem. Based on the returned solution, assignments of the applications to the VMs may be made. Each VM may process the applications assigned to the VM.

Alternatively, the constraint programming solver 104 iterates through each Application VM variable, until all variations of assignments for the set of Application VM variables have been attempted, and yet none of the assignments would satisfy the constraints included in the data model. The constraint programming solver 104 determines that there is no valid solution to the assignment problem. The constraint programming solver 104 may return an error message.

In an embodiment, as described above, the data model includes a search directive that directs the constraint programming solver to find a solution by minimizing a maximum load across the VMs. The search directive may be a min search directive. Based on this search directive, the constraint programming solver 104 determines an order in which assignments are attempted.

As an example, a constraint programming solver may process each Application VM variable sequentially to find a valid solution to the assignment problem. A current Application VM variable may be VM[5, 10, 9], corresponding to the application identified by [Tenant ID 5, Group ID 10, Application ID 9]. A domain of VM[5, 10, 9] may include {VM ID 0, VM ID 1}. The constraint programming solver may determine that assignment of either VM ID 0, or VM ID 1 to VM[5, 10, 9] would not violate any constraints of the assignment problem. The constraint programming needs to determine whether to attempt temporary assignment of VM ID 0 first, or to attempt temporary assignment of VM ID 0 first.

Continuing the example, the constraint programming solver may have already made temporary assignments of other Application VM variables. Based on the existing temporary assignments, the maximum load across the VMs may be six. In particular, the current load of the VM with VM ID 0 may be five. The current load of the VM with VM ID 1 may be six. If the constraint programming solver attempts to assign VM ID 1 to [5, 10, 9], then the current load of the VM with VM ID 1 increases to seven. The maximum load across the VMs increases to seven. If however the constraint programming solver attempts to assign VM ID 0 to VM[5, 10, 9], then the maximum load across the VMs remains as six. Since the search directive aims to minimize the maximum load across the VMs, the constraint programming solver may determine to attempt temporary assignment of VM ID 0.

Continuing the example, the constraint programming solver may continue processing the remaining Application VM variables. If it is not possible to assign a value to any of the remaining Application VM variables while satisfying the constraints, the constraint programming solver may perform backtracking to modify prior temporary assignments. The constraint programming solver may modify the temporary assignment of VM ID 0 to VM[5, 10, 9]. Specifically, the constraint programming solver may now attempt to temporarily assign VM ID 1 to VM[5, 10, 9]. The constraint programming solver may attempt to temporarily assign VM ID 1 to VM[5, 10, 9] if (a) assigning VM ID 1 to VM[5, 10, 9] does not increase the maximum load across the VMs, or (b) assigning any unattempted VM to VM[5, 10, 9] would increase the maximum load across the VMs by a same amount.

In an embodiment, as described above, the data model includes a search directive that directs the constraint programming solver to find a solution by prioritizing assignment of applications to VMs over the assignment of other variables in the data model. The search directive may be a branch search directive. Based on this search directive, the constraint programming solver 104 determines to iterate through the set of Application VM variables, rather than the other decision variables in the data model. The constraint programming solver 104 iterates through the set of Application VM variables to make temporary assignments to the set of Application VM variables as described above. As the constraint programming solver 104 iterates through the set of Application VM variables, the constraint programming solver 104 references and/or modifies other decision variables to determine whether the constraints are satisfied.

One or more embodiments include determining whether there are any new applications to be assigned to VMs in the computer network (Operation 214). The operation of determining whether there are any new applications may be performed periodically. The data model generator 102 identifies a current set of applications to be processed by the computer network. Examples of operations for identifying applications to be processed by the computer network are described with reference to Operation 202. The data model generator 102 determines whether the current set of applications differs from the set of applications previously identified.

Additionally or alternatively, the operation of determining whether there are any new applications may be performed in response to receiving an alert message indicating there is a new application to be processed. Subsequent to receiving the alert message, the data model generator 102 identifies a current set of applications to be processed by the computer network. Examples of operations for identifying applications to be processed by the computer network are described with reference to Operation 202.

Determining whether there are any new applications may include identifying the current set of applications as described with reference to Operation 202. The data model generator 102 identifies the current set of applications, including the new applications. The data model generator 102 identifies the tenant and application group associated with each application. The data model generator 102 assigns a tuple of indexes to each application.

If there are new applications to be assigned to the VMs, then the data model generator 102 reiterates through Operations 204-212. The data model generator 102 identifies a current set of VMs of the computer network. The current set of VMs may include new VMs (hosted on the same and/or new machines) that were added since the last iteration. Based on the current set of applications and the current set of VMs, the data model generator 102 specifies new data model elements, constraints, and search directives. The data model generator 102 applies the new data model to the constraint programming solver.

In an embodiment, the data model generator 102 specifies an additional constraint to the new data model. The additional constraint requires that the assignments of applications to VMs already made in the last iteration must be maintained. The data model generator 102 specifies the additional constraint by limiting the domain of each Application VM variable corresponding to an application that was already assigned a VM in the last iteration. The domain of a particular Application VM variable corresponding to an application that was already assigned a particular VM in the last iteration includes only the VM ID of the particular VM.

As an example, on January 1, a computer network may include VMs having the following set of VM IDs: {VM ID 0, VM ID 1}. The applications to be processed may include Application A, and Application B. Based on the current VMs and applications, a data model generator may apply a particular data model to a constraint programming solver. The constraint programming solver may determine a particular solution. The particular solution may include: (a) an assignment of Application A to the VM with VM ID 0, and (b) an assignment of Application B to the VM of VM ID 1.

On February 1, a new VM with VM ID 2 may be added to the computer network. The computer network may include VMs having the following set of VM IDs: {VM ID 0, VM ID 1, VM ID 2}. Further a new application. Application C, may need to be processed. The applications to be processed may include Application A, Application B, and Application C. Based on the current VMs and applications, the data model generator may apply a new data model to the constraint programming solver.

The new data model may include the same constraints as the previous data model, based on the current VMs and applications. The new data model may further include an additional constraint. The additional constraint may require that the assignments already made in the previous iteration remain the same. Hence, Application A must remain assigned to the VM with VM ID 0. Application B must remain assigned to the VM with VM ID 1. The data model generator specifies the constraint by limiting the domain of the Application VM variables corresponding to Application A and Application B. The domain of the Application VM variable corresponding to Application A includes only VM ID 0. The Application VM variable corresponding to Application B includes only VM ID 1. Meanwhile, the Application VM variable corresponding to the new application, Application C, includes the VM IDs of all VMs: {VM ID 0, VM ID 1, VM ID 2}.

The constraint programming solver may determine a new solution based on the new data model. Based on the additional constraint, the new solution includes (a) an assignment of Application A to the VM with VM ID 0, and (b) an assignment of Application B to the VM with VM ID 1. The new solution may include an assignment of Application C to any of the VMs with VM ID 0, VM ID 1, or VM ID 2, as long as the remaining constraints of the new data model are also satisfied.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
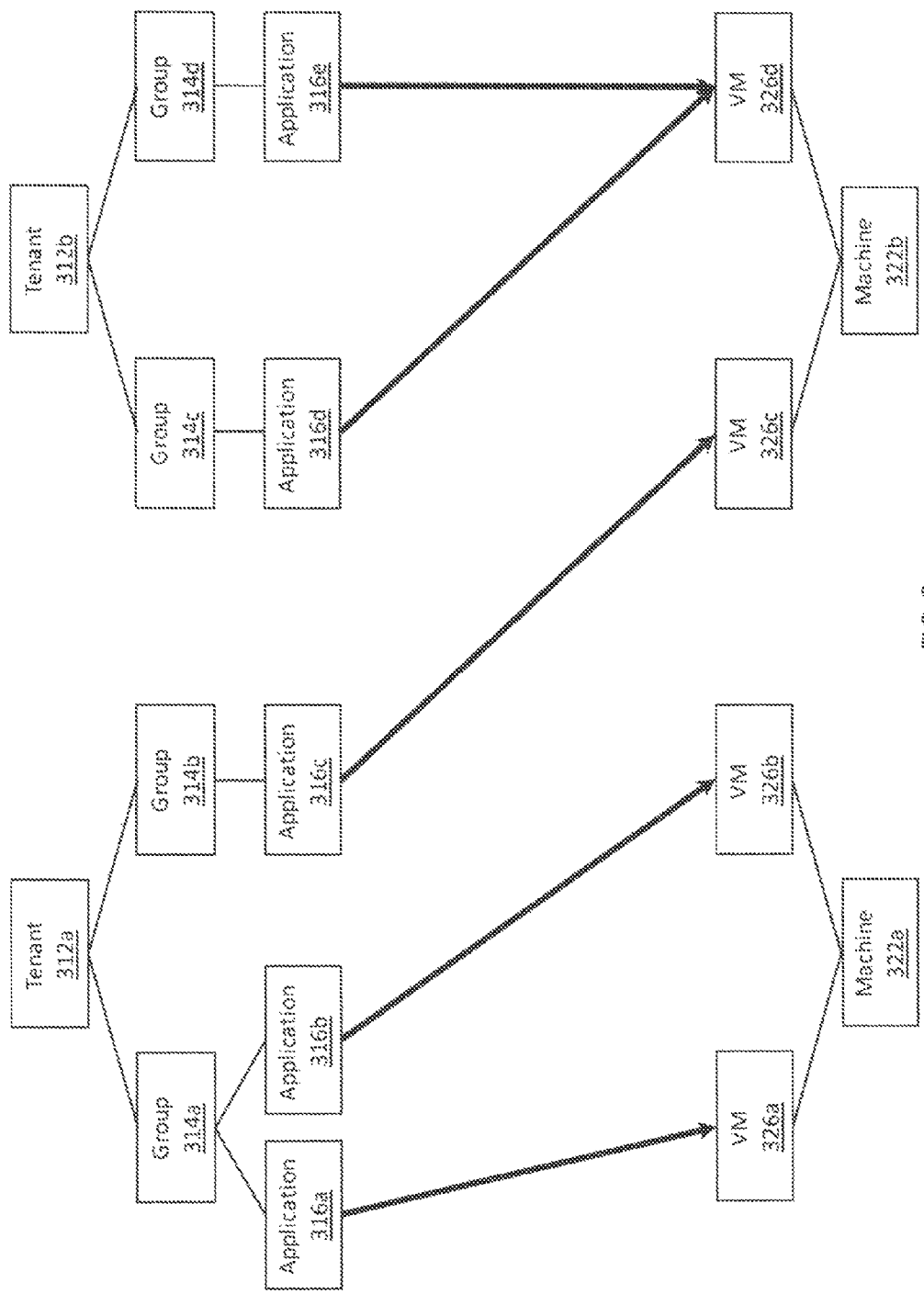
FIG. 3 illustrates an example of assigning applications to virtual machines, in accordance with one or more embodiments.

FIG. 3 illustrates an example of assigning applications to virtual machines, in accordance with one or more embodiments.

As illustrated, a computer network is shared amongst tenants 312a-b. Tenant 312a is associated with Tenant ID 0. Tenant 312b is associated with Tenant ID 1.

Tenant 312a is associated with application groups 314a-b. Application group 314a is associated with Group ID 0. Application group 314b is associated with Group ID 1. Application group 314a is associated with applications 316a-b, which are associated with Application ID 0 and Application 1 respectively. Application group 314b is associated with application 316c, which is associated with Application ID 0.

Tenant 312b is associated with application groups 314c-d. Application group 314c is associated with Group ID 0. Application group 314d is associated with Group ID 1. Application group 314c is associated with application 316d, which is associated with Application ID 0. Application group 314d is associated with application 316e, which is associated with Application ID 0.

Further, the computer network includes machines 322a-b. Machine 322a is associated with Machine ID 0. Machine 322b is associated with Machine ID 1. Machine 322a hosts VMs 326a-b. Machine 322b hosts VMs 326c-d. VM326a-d are associated with VM ID 0, VM ID 1, VM ID 2, and VM ID 3 respectively.

The maximum capacity of machine 322a is 4. The maximum capacity of machine 322b is 5. The maximum capacity of VM 326a is 2. The maximum capacity of VM 326b is 2. The maximum capacity of VM 326c is 3. The maximum capacity of VM 326d is 3.

A data model generator receives information identifying applications 316a-e, groups 314a-d, and tenants 312a-b, from a component of the computer network. The data model generator also receives information identifying VMs 326a-d and machines 322a-b, and corresponding maximum capacities, from a component of the computer network.

The data model generator specifies data model elements for a data model. The data model generator specifies a set Application VM variables, each corresponding to a respective application. The domain of each Application VM variable is the VM IDs corresponding to VMs 326a-d. The set of Application VM variables is expressed as VM[Tenant ID, Group ID, Application ID]. For example, VM[0, 1, 0] corresponds to the application having Tenant ID 0, Group ID 1, and Application ID 0, which is application 316c.

The data model generator specifies a set of VM Tenant variables, each corresponding to a respective VM. The domain of each VM Tenant variable includes (a) the Tenant IDs corresponding to tenants 312a-b and (b) a null value that does not correspond to any tenant. The set of VM Tenant variables is expressed as Tenant[VM ID]. For example, Tenant[2] corresponds to the VM having VM ID 2, which is VM 326c.

The data model generator specifies a set of Group Machine variables, each corresponding to a respective application group. The domain of each Group Machine variable is the Machine IDs corresponding to machines 322a-b. The set of Group Machine variables is expressed as Machine [Tenant ID, Group ID]. For example, Machine[1, 1] corresponds to the application group having Tenant ID 1 and Group ID 1, which is application group 314d.

The data model generator specifies a set of VM Load variables, each corresponding to a respective VM. The domain of each VM Load variable is a range of numbers starting from zero (0) to the maximum capacity of the corresponding VM. The set of VM Load variables is expressed as VMLoad[VM ID]. For example, VM[0] corresponds to VM 326a. Since the maximum capacity of VM 326a is 2, the domain of VM[0] is {0, 1, 2}. VM[2] corresponds to VM 326c. Since the maximum capacity of VM 326c is 3, the domain of VM[2] is {0, 1, 2, 3}.

The data model generator specifies a set of Machine Load variables, each corresponding to a respective machine. The domain of each Machine Load variable is a range of numbers starting from zero (0) to the maximum capacity of the corresponding machine. The set of Machine Load variables is expressed as MachineLoad[Machine ID]. For example, Machine[1] corresponds to machine 322b. Since the maximum capacity of machine 322b is 5, the domain of Machine [1] is {0, 1, 2, 3, 4, 5}.

The data model generator specifies constraints for the data model. The data model generator specifies a constraint that limits assignment of any particular application to a VM corresponding to a tenant associated with the particular application. The data model generator expresses the constraint as an element constraint using the set of Application VM variables and the set of VM Tenant variables. The constraint is expressed as:

Tenant[VM[Tenant ID, Group ID, Application ID]]= Tenant ID, for all Tenant IDs, Group IDs, and Application IDs.

The data model generator specifies a constraint that limits assignment of applications of a same application group to VMs executing on a same machine. The data model generator specifies the constraint by limiting a relationship between the set of Application VM variables and the set of Group Machine variables. The constraint is expressed as follows:

lowerBound<VM[Tenant ID, Group ID, Application ID)]≤upperBound, for all Tenant IDs, Group IDs, and Application IDs.

The lower bound is expressed as follows: lowerBound=(number of VMs per machine)×(Machine[Tenant ID, Group ID]−1), wherein the number of VMs per machine is 2. The upper bound is expressed as follows: upperBound=lowerBound+(number of VMs per machine), wherein the number of VMs per machine is 2.

The data model generator specifies a constraint that limits assignment of applications of a same application group to different VMs. The data model generator specifies the constraint by using the set of Application VM variables. The AllDifferent(VM[Tenant ID, Group ID]), for all Tenant IDs, and Group IDs.

The data model generator specifies a constraint that limits a number of applications assigned to a particular VM to a maximum capacity of the particular VM. The data model generator specifies the constraint as a global cardinality constraint, using the set of Application VM variables and the set of VM Load variables. The set of Application VM variables is the set of variable elements of the GCC. A list of VM IDs of VMs 326a-d is the set of value elements of the GCC. The set of VM Load variables is the set of counting elements of the GCC. The constraint is expressed as:

GCC(VM[Tenant ID, Group ID, Application ID], {VM IDs of VM 326a-d}, VMLoad[VM ID]).

The data model generator specifies a constraint that limits a number of applications assigned to a particular machine to a maximum capacity of the particular machine. The data model generator specifies the constraint using the set of Machine Load variables. The constraint may be expressed for as a separate formula for each particular machine, identified by each particular Machine ID. The formula may be expressed as:

MachineLoad[Machine ID]=sum(VMLoad[VM ID]), for all VM IDs of VMs hosted by the particular machine identified by the particular Machine ID.

The data model generator specifies search directives for the data model. The data model generator specifies a search directive that directs a constraint programming solver to find a solution by minimizing a maximum load across the VMs. The data model generator specifies the search directive using a mar function and a min search directive. The search directive is expressed as:

min(max(VMLoad[VM ID])).

The data model generator further specifies limitations regarding the values of the set of VM Load variables. Based on the limitations, the constraint programming solver only attempts a limited combination of values for the set of VM Load variables. The limited combination of values for the set of VM Load variables must satisfy the following:

$$\frac{\text{(Number of Applications)}}{\text{(Number of VMs)}} \leq$$

$$\max(VMLoad[VM\ ID]) \leq \max(VMCapacity[VM\ ID]), \text{ or}$$

$$\frac{(5)}{(4)} < \max(VMLoad[VM\ ID]) < \max(VMCapacity[VM\ ID]).$$

The data model generator specifies a search directive that directs the constraint programming solver to find a solution by prioritizing assignment of applications to VMs over the assignment of other variables in the data model. The data model generator specifies the search directive using a branch search directive. The search directive is expressed as:

branch(VM[Tenant ID, Group ID, Application ID]).

The data model generator applies the data model to the constraint programming solver. The constraint programming solver applies constraint programming algorithms. The constraint programming solver returns a solution based on the data model.

The solution includes the following assignments for the set of Application VM variables:
 application 316a is assigned to VM 326a;
 application 316b is assigned to VM 326b;
 application 316c is assigned to VM 326c;
 application 316d is assigned to VM 326d;
 application 316e is assigned to VM 326d.

The solution includes the following assignments for the set of VM Tenant variables:
 VM326a is assigned to tenant 312a;
 VM326b is assigned to tenant 312a;
 VM326c is assigned to tenant 312a;
 VM326d is assigned to tenant 312b.

The solution includes the following assignments for the set of Group Machine variables:
 group 314a is assigned to machine 322a;
 group 314b is assigned to machine 322b;
 group 314c is assigned to machine 322b;
 group 314d is assigned to machine 322b.

The solution satisfies the constraints of the data model. As described above, one constraint limits assignment of any particular application to a VM corresponding to a tenant associated with the particular application. Application 316d and application 316e may be analyzed as an example. According to the solution, application 316d and application 316e are assigned to VM 326d. Also according to the solution, VM 326d is assigned to tenant 312b. Hence, application 316d and application 316e are assigned to a particular VM (VM 326a) that corresponds to a particular tenant (tenant 312b). Further, application 316d and application 316e are each associated with tenant 312b. Since applications 316d-e are associated with the same tenant (tenant 312b) corresponding to VM 326a, the constraint is satisfied.

As described above, another constraint limits assignment of applications of a same application group to VMs executing on a same machine. Group 314a may be analyzed as an example. Group 314a includes applications 316a and 316b. According to the solution, application 316a is assigned to VM 326a and application 316b is assigned to VM 326b. Both VM 326a and VM 326b are hosted by machine 322a. Since VMs 326a-b are hosted on a same machine, the constraint is satisfied.

As described above, another constraint limits assignment of applications of a same application group to different VMs. Group 314a may be analyzed as an example. Group 314a includes applications 316a and 316b. According to the solution, application 316a is assigned to VM 326a and application 316b is assigned to VM 326b. Since VMs 326a-b are different VMs, the constraint is satisfied.

As described above, another constraint limits a number of applications assigned to a particular VM to a maximum capacity of the particular VM. VM 326b may be analyzed as an example. According to the solution, the load of VM 326b is 1. The maximum capacity of VM 326b is 2. Since the load of VM 326b is less than the maximum capacity of VM 326b, the constraint is satisfied.

As described above, another constraint limits a number of applications assigned to a particular machine to a maximum capacity of the particular machine. According to the solution, the load of machine 322b is 3. The maximum capacity of machine 322b is 5. Since the load of machine 322b is less than the maximum capacity of machine 322b, the constraint is satisfied.

5. Allocation and Assignment of Virtual Machines

In one or more embodiments, the operations described with reference to FIGS. 2A-2C may be used for allocating virtual machines (VMs) to tenants, based on the respective entitlements of each tenant to a computer network. Allocation of VMs to tenants is performed prior to assigning applications of the tenants to the VMs. Allocating VMs to tenants is also referred to herein as provisioning VMs to tenants.

The entitlement of a particular tenant specifies (a) a maximum number of application groups, and/or (b) a maximum number of applications, that may be processed by the computer network for the particular tenant. The entitlement is based on the computing services purchased by the particular tenant.

As an example, different computing services may be offered to different types of tenants. Computing services may be purchased in different increments based on the type of tenant. For standard tenants, computing services may be purchased in increments of two application groups, each including two applications. For enterprise tenants, computing services may be purchased in increments of four application groups, each including four applications.

Continuing the example, Tenant A may be a standard tenant. Tenant A may purchase 50 increments, which equates to an entitlement of 100 application groups, including 200 applications. Tenant B may be an enterprise tenant. Tenant B may purchase 100 increments, which equates to an entitlement of 400 application groups, including 1,600 applications.

Based on a set of entitlements corresponding to the tenants, the data model generator generates a data model. Referring to FIG. 2A, rather than identifying applications to be processed by the computer network at Operation 202, the data model generator 102 identifies the entitlements associated with the tenants of the computer network. The data model generator 102 may receive the information from a component of the computer network. Additionally or alternatively, the data model generator 102 may receive the information from another application and/or via user input. The application groups and applications included in the entitlements are considered as "hypothetical application groups" and "hypothetical applications" for generating the data model.

The data model generator 102 continues to generate the data model, as described above with reference to Operations 204-212, based on the hypothetical application groups and hypothetical applications. The data model includes the constraints, as described above with reference to Operations 222-230. The solution obtained by the constraint programming solver 104 assigns VMs to the hypothetical applications, corresponding to the hypothetical application groups, associated with the tenants of the computer network. The solution determines the values assumed by each of the set of Application VM variables, the set of Group Machine variables, the set of VM Tenant variables, the set of VM Load variables, and the set of Machine Load variables.

The values assumed by the set of VM Tenant variables determines the allocations of the VMs to the tenants, based on the entitlements. As an example, a solution obtained by a constraint programming solver may include the following assignments of VM Tenant variables, based on hypothetical application groups and hypothetical applications:
 VM A is assigned to Tenant A;
 VM B is assigned to Tenant A;
 VM C is assigned to Tenant B.

Continuing the example, based on the assignments, the following allocations of VMs may be determined:
 VM A is allocated to Tenant A;
 VM B is allocated to Tenant A;
 VM C is allocated to Tenant B.

After allocations of VMs to tenants are determined based on the entitlements of the tenants, actual applications to be processed by the computer network are received. The actual applications must be assigned to the VMs based on the allocations of the VMs to the tenants.

The data model generator 102 identifies the actual applications, corresponding to application groups of different tenants, as described above with reference to Operation 202.

The data model generator 102 continues to generate the data model, as described above with reference to Operations 204-212. The data model generator 102 generates the data model using the actual applications. The data model includes the constraints, as described above with reference to Operations 222-230.

The data model generator 102 further specifies an additional constraint. The additional constraint requires that the assignments of the actual applications to the VMs match the allocations of VMs to the tenants. The data model generator 102 specifies the constraint by limiting the domain of each Application VM variable. The domain of a particular Application VM variable, corresponding to a particular application of a particular tenant, includes only the VM IDs of the VMs that were allocated to the particular tenant.

As an example, the following allocations may have been previously determined:
 VM A is allocated to Tenant A;
 VM B is allocated to Tenant A;
 VM C is allocated to Tenant B;
 VM D is allocated to Tenant B.

Continuing the example, a data model generator generates a particular Application VM variable corresponding to an application of Tenant A. The domain of the particular Application VM variable includes the VM IDs of the VMs allocated to Tenant A: {VM A, VM B}.

Continuing the example, the data model generator generates a particular Application VM variable corresponding to an application of Tenant B. The domain of the particular Application VM variable includes the VM IDs of the VMs allocated to Tenant B: {VM C, VM D}.

As illustrated in this example, the data model generator expresses the additional constraint using the limited domains of each of the set of Application VM variables.

The data model generator 102 applies the new data model, including the additional constraint, to the constraint programming solver 104. The solution obtained by the constraint programming solver 104 assigns VMs to the actual applications, while adhering to the allocations of the VMs to the tenants as previously determined.

6. Cloud Computing Networks

In one or more embodiments, a cloud computing network provides a pool of resources that are shared amongst multiple client devices. The pool of resources may be geographically centralized and/or distributed. Examples of resources include a processor, a server, a data storage device, a virtual machine (VM), a platform, and/or a software application. Client devices may independently request computing services, such as server time and network storage space, as needed. The resources may be dynamically assigned to the requests and/or client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants" or "customers"). Each tenant is associated with one or more client devices for accessing the cloud resources. Several tenants may use a same particular resource, such as a server, at different times and/or at the same time. The cloud resources may be located at one or more remote off-premise locations, away from the premises of the tenants. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, in a multi-tenant cloud computing network, each tenant may be independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In an embodiment, in a multi-tenant cloud computing network, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
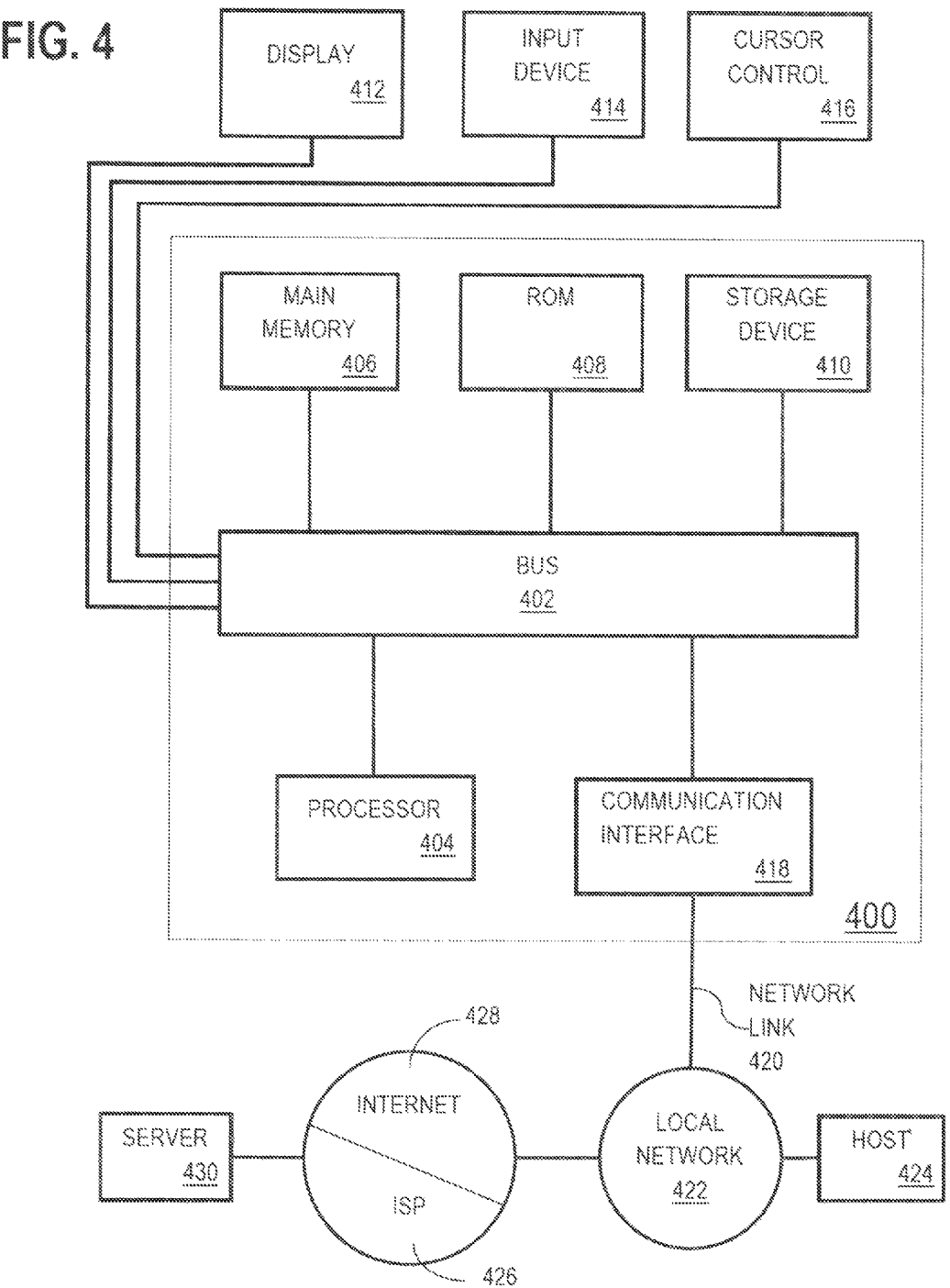
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a plurality of applications, each application of the plurality of applications being grouped into a respective group of a set of groups;
   identifying a plurality of candidate virtual machines (VMs), each candidate VM of the plurality of candidate VMs being executed by a respective machine of a set of machines;
   specifying a set of one or more constraints that:
      limits assignment of any particular application, of the plurality of applications, to a candidate VM corresponding to a tenant associated with the particular application;
      limits assignment of a subset of the plurality of applications corresponding to a same group to candidate VMs executing on a same machine;
   storing a data model, applicable to a constraint programming solver, comprising:
      a first plurality of data model elements corresponding respectively to the plurality of applications;
      a second plurality of data model elements corresponding respectively to the plurality of candidate VMs;
      a third plurality of data model elements corresponding respectively to a plurality of machines configured for executing one or more of the candidate VMs; and
      the set of constraints.

2. The medium of claim 1, wherein a grouping of the applications is determined based on one or more relationships between datasets corresponding respectively to the applications.

3. The medium of claim 1, wherein a particular subset of the plurality of applications corresponding to a particular group corresponds to a plurality of partitions or shards of a particular database.

4. The medium of claim 1, wherein the operations further comprise:
   obtaining a solution comprising assignments of the plurality of applications to the plurality of candidate VMs;
   subsequent to obtaining the solution:
      identifying one or more new applications to be assigned to the plurality of candidate VMs; and
      specifying a new constraint that limits assignment of the new applications to the plurality of candidate VMs without modifying at least one of the assignments of the plurality of applications to the plurality of candidate VMs specified by the solution.

5. The medium of claim 1, wherein the operation of identifying the plurality of applications is performed periodically.

6. The medium of claim 1, wherein wherein the operation of identifying the plurality of applications is performed in response to detecting a new application to be assigned to one of the plurality of candidate VMs.

7. The medium of claim 1, wherein the set of constraints further limits assignment of each of the subset of the applications corresponding to the same group to a different VM.

8. The medium of claim 1, wherein the set of constraints further limits a number of applications assigned to a particular candidate VM, of the plurality of candidate VMs, to a maximum capacity of the particular candidate VM.

9. The medium of claim 8, wherein the maximum capacity of the particular candidate VM is different from a second maximum capacity of a second candidate VM of the plurality of candidate VMs.

10. The medium of claim 1, wherein the set of constraints further limits a number of applications assigned to a particular machine, of the set of machines, to a maximum capacity of the particular machine.

11. The medium of claim 10, wherein the maximum capacity of the particular machine is different from a second maximum capacity of a second machine of the plurality of machines.

12. The medium of claim 1, wherein the operations further comprise:
specifying a set of one or more search directives that directs the constraint programming solver to find a solution by minimizing a maximum load across the plurality of candidate VMs.

13. The medium of claim 1, wherein the operations further comprise:
specifying a set of one or more search directives that directs the constraint programming solver to find a solution by prioritizing assignment of the plurality of applications to the plurality of candidate VMs over assignment of other decision variables in the data model.

14. The medium of claim 1, wherein one of the set of constraints comprises using a first set of decision variables to index into a second set of decision variables.

15. The medium of claim 1, wherein:
the data model further comprises:
a fourth plurality of data model elements corresponding respectively to the candidate VM assigned to each application; and
a fifth plurality of data model elements corresponding respectively to the tenant assigned to each candidate VM; and
specifying the set of constraints that limits assignment of any particular application, of the plurality of applications, to the candidate VM corresponding to the tenant associated with the particular application comprises: using the fourth plurality of data model elements to index into the fifth plurality of data model elements.

16. The medium of claim 1, wherein the operations further comprise:
initiating execution of at least one of the plurality of candidate VMs.

17. The medium of claim 1, wherein the operations further comprise applying the constraint programming solver to the data model to assign a particular application, of the plurality of applications, to a particular candidate VM of the plurality of candidate VMs.

18. The medium of claim 1, wherein the operations further comprise assigning a particular application, of the plurality of applications, to a particular candidate VM of the plurality of candidate VMs.

19. The medium of claim 1, wherein:
a grouping of the applications is determined based on one or more relationships between datasets corresponding respectively to the applications;
a particular subset of the plurality of applications corresponding to a particular group corresponds to a plurality of partitions or shards of a particular database;
the operation of identifying the plurality of applications is performed periodically;
the set of constraints further limits assignment of each of the subset of the applications corresponding to the same group to a different VM;
the set of constraints further limits a number of applications assigned to a particular candidate VM, of the plurality of candidate VMs, to a maximum capacity of the particular candidate VM, wherein the maximum capacity of the particular candidate VM is different from a second maximum capacity of a second candidate VM of the plurality of candidate VMs
the set of constraints further limits a number of applications assigned to a particular machine, of the set of machines, to a maximum capacity of the particular machine, wherein the maximum capacity of the particular machine is different from a second maximum capacity of a second machine of the plurality of machines
one of the set of constraints comprises using a first set of decision variables to index into a second set of decision variables
the operations further comprise:
specifying a set of one or more search directives that directs the constraint programming solver:
to find a solution by minimizing a maximum load across the plurality of candidate VMs;
to find a solution by prioritizing assignment of the plurality of applications to the plurality of candidate VMs over assignment of other decision variables in the data model;
applying the constraint programming solver to the data model to obtain a solution comprising assignments of the plurality of applications to the plurality of candidate VMs;
assigning the plurality of applications to the plurality of candidate VMs based on the solution;
subsequent to applying the constraint programming solver to the data model to obtain the solution:
identifying one or more new applications to be assigned to the plurality of candidate VMs; and
specifying a new constraint that limits assignment of the new applications to the plurality of candidate VMs without modifying at least one of the assignments of the plurality of applications to the plurality of candidate VMs specified by the solution.

20. A system, comprising:
at least one device including a hardware processor;
the system being configured to perform operations comprising:
identifying a plurality of applications, each application of the plurality of applications being grouped into a respective group of a set of groups;
identifying a plurality of candidate virtual machines (VMs), each candidate VM of the plurality of candidate VMs being executed by a respective machine of a set of machines;
specifying a set of one or more constraints that:
limits assignment of any particular application, of the plurality of applications, to a candidate VM corresponding to a tenant associated with the particular application;
limits assignment of a subset of the plurality of applications corresponding to a same group to candidate VMs executing on a same machine;
storing a data model, applicable to a constraint programming solver, comprising:
a first plurality of data model elements corresponding respectively to the plurality of applications;

a second plurality of data model elements corresponding respectively to the plurality of candidate VMs;

a third plurality of data model elements corresponding respectively to a plurality of machines configured for executing one or more of the candidate VMs; and the set of constraints.

* * * * *

UNITED STATES PATENT AND TRADEMARK OFFICE
CERTIFICATE OF CORRECTION

PATENT NO. : 10,007,538 B2
APPLICATION NO. : 15/211458
DATED : June 26, 2018
INVENTOR(S) : Kadioglu et al.

Page 1 of 1

It is certified that error appears in the above-identified patent and that said Letters Patent is hereby corrected as shown below:

In the Specification

In Column 7, Line 63, delete "ID)]." and insert -- ID]. --, therefor.

In Column 8, Line 35, delete "ID." and insert -- ID, --, therefor.

In Column 9, Line 9, delete "3." and insert -- 3, --, therefor.

In Column 14, Line 8, after "upperBound" insert -- = --.

In Column 16, Line 64, delete "mar" and insert -- max --, therefor.

In Column 19, Line 10, delete "0," and insert -- 0 --, therefor.

In Column 19, Line 23, delete "[5," and insert -- VM[5, --, therefor.

In Column 20, Line 62, delete "application." and insert -- application, --, therefor.

In Column 21, Line 60, delete "VM326a-d" and insert -- VMs 326a-d --, therefor.

In Column 23, Line 6, delete "ID)]" and insert -- ID] --, therefor.

In Column 23, Line 51, delete "mar" and insert -- max --, therefor.

In the Claims

In Column 32, Line 58, in Claim 6, delete "wherein wherein" and insert -- wherein --, therefor.

Signed and Sealed this
Second Day of April, 2019

Andrei Iancu
*Director of the United States Patent and Trademark Office*